United States Patent Office 3,560,433
Patented Feb. 2, 1971

3,560,433
POLYURETHANES STABILIZED WITH
PIPERIDINOSULFIDES
Isamu Suzuki and Kiyoshi Ichikawa, Fuji, and Keisuke Murayama and Syoji Morimura, Tokyo, Japan, assignors to Sanko Company Limited, Tokyo, and Asahi Kasei Kogyo Kabushiki Kaisha, Osaka, Japan
No Drawing. Filed June 5, 1969, Ser. No. 830,874
Claims priority, application Japan, June 8, 1968,
43/39,235
Int. Cl. C08g 51/58, 51/60
U.S. Cl. 260—45.8                                    8 Claims

ABSTRACT OF THE DISCLOSURE

This invention discloses the stabilization of polyurethane elastomers against deterioriations by light, heat and chlorine bleaching by incorporating therein at least one of piperidinosulfide compounds alone or in combination with at least one of phenol compounds, in a sufficient amount to effectively prevent such deteriorations, usually each in an amount of 0.01 to 5% by weight based on the amount of the polyurethane polymers.

---

This invention relates to the stabilization of polyurethane elastomers including polyurethane elastic yarns.

More particularly, this invention relates to the stabilization of polyurethane elastomers by incorporating therein at least one of piperidinosulfide compounds having the general formula

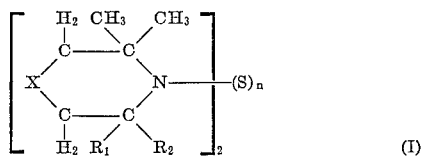

(I)

wherein $R_1$ and $R_2$, which may be the same or different, represent an alkyl group such as methyl, ethyl, proply, dodecyl or stearyl, a cycloalkyl group such as cyclopentyl or cyclohexyl, an aryl group such a phenyl, tolyl, chlorophenyl, anisyl, or naphthyl, or hydrogen atom provided that $R_1$ and $R_2$ are not simultaneously hydrogen atom, or they form, together with the carbon atom to which they are bonded, a saturated 5-, 6-, or 7-membered alicyclic ring which may be optionally substituted with an alkyl group such as methyl or ethyl; X represents >C=O, >CH$_2$ or a group of the formula >CH—O—R$_3$ (wherein R$_3$ represents hydrogen atom, an acyl group such as acetyl or benzoyl, or a N-substituted carbamoyl group such as N-ethylcarbamoyl, N-phenylcarbamoyl or N-cyclohexylcarbamoyl); and $n$ represents an integer of 2 to 4 inclusive.

In another aspect, this invention is concerned with the stabilization of polyurethane elastomers by incorporating therein at least one of the piperidinosulfide compounds of the Formula I in combination with at least one of phenol compounds having the general formula

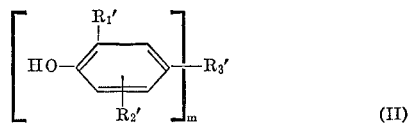

(II)

wherein $R_1'$ represents hydrogen atom or tert.-butyl; $R_2'$ represents hydrogen atom or an alkyl group such as methyl or tert.-butyl; $m$ represents an integer of 1 or 2; and $R_3'$ represents an alkyl group such as methyl, butyl or octyl or an alkoxy group such as methoxy, ethoxy or octoxy, when $m$ is 1, or represents sulfur atom,

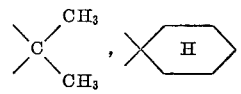

or a group of the formula

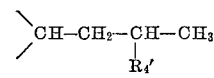

[wherein $R_4'$ represents hydrogen atom or a group of the formula

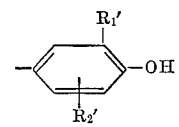

(wherein $R_1'$ and $R_2'$ are as defined above.)], when $m$ is 2.

Polyurethane elastomers have been widely utilized in view of excellent mechanical and elastic properties, but they frequently tend to undergo severe photo-deterioration with coloration when exposed to light such as sunlight or ultraviolet light. For the purpose of stabilizing polyurethanes against such photo-deterioration, a number of light stabilizers have heretofore been proposed in the art. For example, phenol compounds or benzophenone compounds have generally been widely employed as such stabilizers. These prior art stabilizers are, however, not satisfactorily effective in the stabilization of polyurethanes. Thus, there has been a need for the polyurethane elastomers having an excellent stability against the deterioration especially by the long-time outdoor exposure to sunlight or the repeated dry cleanings.

As a result of our extensive investigation, it has been unexpectedly found that the polyurethane elastomer compositions to which at least one of piperidinosulfide compounds of the Formula I is added solely or in combination with at least one of phenol compounds of the Formula II have excellent stability against the deteriorations by light, heat and chlorine bleaching and they do not cause coloration of the product thereof.

It is therefore an object of the present invention to provide polyurethane elastomer compositions including polyurethane elastic yarns having an improved stability.

The piperidinosulfide compounds (I) employed in this invention may readily be prepared in accordance with the known method, for example the process described in Tetrahedron 23, 1697 (1967) wherein a piperidine compound (III) is, under cooling to −40° C., reacted with sulfur dichloride or sulfur monochloride in dimethylformamide to obtain the piperidinosulfide compound (I), as shown by the following schema:

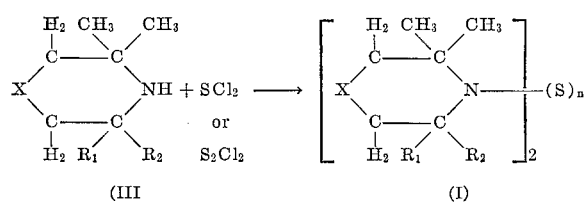

(III)     (I)

wherein $R_1$, $R_2$, $n$ and $X$ are as defined above.

Preferred examples of the piperidinosulfide compounds represented by the Formula I are as follows:

I-1 bis(2,2,6,6-tetramethylpiperidino) disulfide,
I-2 bis(2,2,6,6-tetramethylpiperidino) trisulfide,
I-3 bis(4-oxo-2,2,6,6-tetramethylpiperidino) disulfide,
I-4 bis(4-oxo-2,2,6,6-tetramethylpiperidino) trisulfide,
I-5 bis(2,2-dimethyl-4-oxo-6-cyclohexylpiperidino)-disulfide,
I-6 bis(2,2-dimethyl-6-phenylpiperidino) disulfide,
I-7 bis(2,2,6-trimethyl-6-phenyl-4-oxopiperidino)-disulfide,
I-8 1,1'-bis(1-aza-2,2-dimethyl-4-oxo-spiro[5,5]-undecyl) trisulfide,
I-9 1,1'-bis(1-aza-2,2-dimethyl-7-methyl-spiro[5,5]-undecyl) disulfide,
I-10 bis(4-hydroxy-2,2,6,6-tetramethylpiperidino)-disulfide,
I-11 bis(4-benzoyloxy-2,2,6,6-tetramethylpiperidino)-tetrasulfide, and
I-12 bis[4-(N-phenylcarbamoyloxy)-2,2,6,6-tetramethylpiperidino] disulfide.

The phenol compounds of the Formula II are also known stabilizers. It has been also found that the incorporation of the phenol compound (II) in combination with the piperidinosulfide compound (I) gives, due to their synergism, polyurethane elastomer compositions having excellent stability against deteriorations by light, heat and chlorine bleaching, in comparison with the case where each of these compounds is incorporated solely.

Preferred examples of the phenol compounds of the Formula II are as follows:

II-1 4-methyl-2,6-di-tert.-butylphenol,
II-2 2-tert.-butyl-4-methoxyphenol,
II-3 1,1-bis(2-methyl-4-hydroxy-5-tert.-butylphenyl) butane,
II-4 bis(2-methyl-4-hydroxy-5-tert.-butylphenyl) sulfide,
II-5 1,1,3-tris(2-methyl-4-hydroxy-5-tert.-butylphenyl)-butane,
II-6 2,2-bis(4-hydroxyphenyl) propane, and
II-7 1,1-bis(4-hydroxyphenyl) cyclohexane.

A polyurethane elastomer to be employed in the present invention may be usually prepared by the following method. A relatively low molecular weight polymer having terminal active hydrogen, for example polyether or polyester, is reacted with an organic polyisocyanate and a chain extender having two or more active hydrogen atoms, for example diamine, glycol, water or the mixtures thereof, in the presence or absence of a solvent in a single stage or multi-stage reaction to produce a high molecular weight polyurethane elastomer. Such method is disclosed in, for example, Japanese patent publications Nos. 2,994/1959, 22682/1964, 488/1966 and 13629/1967 and Japanest patent applications Nos. 43,100/1967 and 54,998/1967. In the above method, as a polyisocyanate and a chain extender, an aromatic diisocyanate and a diamine are preferably employed respectively, in view of the desired properties of the product.

The polyurethane elastomer compositons can be molded, for example, into fibre, resin, film, sheet and the like by the known suitable methods. Among those molded articles, the elastic yarn obtained, for example, by the dry spinning is especially important in this invention.

The piperidinosulfide compound (I) and the phenol compound (II) are usually added in an amount of 0.01 to 5% by weight each, based on the amount of polyurethane polymers. These compounds are preferably employed in the form of fine powders or a solution thereof in a suitable solvent, and they may be incorporated in polyurethane at either a stage prior to completion of the polymerization reaction of polyurethane or any desired stage posterior to completion of the polymerization reaction. In any case, the piperidinosulfide compound (I) and the phenol compound (II) can readily be dispersed and incorporated in polyurethane elastomer since they have excellent compatibility with polyurethane.

Other conventionally known additives such as reaction promotors; fillers, pigments or the like may be optionally incorporated in the polyurethane elastomer compositions.

The following examples are given to further illustrate the present invention. The scope of the invention is not, however, meant to be limited to the specific details of the examples.

EXAMPLE 1

100.0 g. of polyethylene adipate having an average molecular weight of 1,250 were reacted, while stirring, with 32.0 g. of 4,4'-diphenyl-methane diisocyanate at 95° C. for 90 minutes under nitrogen stream to obtain a prepolymer having terminal isocyanate groups. After the prepolymer was cooled to room temperature, it was dissolved, while stirring, in 150 g. of dry dimethylacetamide at room temperature to form a uniform prepolymer solution.

Separately, a mixture of 4.2 g. of tetramethylenediamine, 0.1 g. of water and 100 g. of dimethylacetamide was prepared. To this mixture was added said prepolymer solution while stirring at room temperature. To the resulting solution having high viscosity was added a solution of an indicated amount of the stabilizer given below in 15 g. of dimethylacetamide, followed by sufficient stirring. After degassing, the resulting viscous solution was extruded through a spinneret into an air stream heated to 210° C. and having a length of 4 m. at a spinning rate of 320 m./min. The elastic yarn thus obtained had a strength of 0.79 g./d., and elongation of 810% and a permanent set of 4.2%.

The polyurethane elastic yarn produced by the above process was tested with regard to stabilities against deteriorations by light and chlorine bleaching as follows. The test sample was exposed to ultraviolet irradiation for 15 hours by means of a fade meter prescribed in Japanese Industrial Standard, JIS–1044-3-8, whereupon the test sample was examined on the strength and the coloration. With respect to the test of stability against deterioration by chlorine bleaching, the test sample was immersed in a 0.5% aqueous solution of sodium hypochlorite at 50° C. for 24 hours, whereupon the test sample was examined on strength and coloration. The average value of the results obtained from five test samples is shown in the following Table 1.

As is apparent from Table 1, the elastic yarn having the present stabilizer incorporated therein was excellent in light stability and chlorine bleaching stability. Particularly, with regard to the yarn in which the piperidinosulfide compound is incorporated in combination with the phenol compound, there was observed a remarkable effect due to synergism of both compounds.

TABLE 1

| Kind of stabilizer:[1] | Added amount, percent[2] | Light stability | | Chlorine bleaching stability | |
|---|---|---|---|---|---|
| | | Retention of strength, percent | Coloration | Retention of strength, percent | Coloration |
| I-1 | 0.6 | 83.0 | Colorless | 88.0 | Pale yellow |
| I-2 | 0.6 | 80.7 | do | 81.5 | Do. |
| I-3 | 0.6 | 79.5 | do | 90.2 | Do. |
| I-4 | 0.6 | 88.6 | do | 78.8 | Do. |
| I-5 | 0.6 | 90.2 | do | 80.2 | Do. |
| I-6 | 0.6 | 85.0 | do | 86.0 | Do. |
| I-7 | 0.6 | 72.3 | do | 76.3 | Do. |
| I-8 | 0.6 | 80.4 | do | 91.6 | Do. |
| I-9 | 0.6 | 84.8 | do | 85.5 | Do. |
| I-10 | 0.6 | 84.5 | do | 88.7 | Do. |
| I-11 | 0.6 | 89.0 | do | 83.8 | Do. |
| I-12 | 0.6 | 76.9 | do | 85.9 | Do. |
| I-3 plus II-1 | 0.3+0.3 | 99.5 | do | 96.5 | Do. |
| I-3 plus II-3 | 0.3+0.3 | 98.3 | do | 94.7 | Do. |
| I-3 plus II-6 | 0.3+0.3 | 96.1 | do | 94.2 | Do. |
| II-1 | 0.6 | 54.4 | Pale yellow | 58.3 | Brown. |
| II-3 | 0.6 | 61.6 | do | 45.0 | Do. |
| II-6 | 0.6 | 51.0 | do | 50.5 | Do. |
| Non-added | | 28.8 | Yellow | 30.8 | Do. |

[1] The stabilizer is shown in terms of the number as described hereinabove.
[2] Percent weight based on the amount of polyurethane polymer.

EXAMPLE 2

The same procedure as described in Example 1 was repeated using as reactants 115.2 g. of polycaprolactone glycol having an average molecular weight of 1,440 and 27.8 g. of 2,4-tolylene diisocyanate to obtain a prepolymer having terminal isocyanate groups. After degassing at 105° C. under a pressure of 2 mm. Hg, 19.2 g. of methylene-bis-o-chloroaniline and an indicated amount of the stabilizer given below were added to said prepolymer by stirring. After degassing again, the resulting mixture was poured into a mold and cured at 105° C. for 12 hours, followed by allowing it to stand at room temperature for 10 days. There was obtained a sheet having a strength of 430 kg./cm.$^2$, an elongation of 700% and a Shore A hardness of 88.

The polyurethane elastomer sheet produced by the above process was tested with regard to light stability and thermal stability. The test of light stability was conducted in the same manner as described in Example 1. With regard to the test of thermal stability, the test sample was heated at 150° C. for 6 hours, whereupon the test sample was examined on strength and coloration. The average value of the results obtained from five test samples is shown in the following Table 2.

As is apparent from Table 2, the polyurethane sheet in which the present piperidinosulfide compound and phenol compound are incorporated in an amount of 0.1% by weight each showed remarkably high stability due to synergism of both compounds, as compared with the sheet in which the present piperidinosulfide compound or phenol compound is incorporated solely in an amount of 1.5% by weight.

TABLE 2

| Stabilizer and added amount,[2] percent[1] | | Light Stablity | | Thermal stability | |
|---|---|---|---|---|---|
| I-1 | II-3 | Retention of strength, percent | Coloration | Retention of strength, percent | Coloration |
| 0.3 | 0.3 | 95.4 | Colorless | 91.3 | Colorless. |
| 0.1 | 0.1 | 87.6 | do | 90.2 | Do. |
| 0.05 | 0.05 | 78.2 | do | 89.5 | Do. |
| 0.3 | | 68.5 | do | 76.7 | Do. |
| 0.6 | | 76.8 | do | 88.0 | Do. |
| 1.5 | | 80.4 | do | 90.5 | Do. |
| | 0.3 | 35.1 | Pale yellow | 68.5 | Pale yellow. |
| | 0.6 | 62.9 | do | 73.2 | Do. |
| | 1.5 | 73.2 | do | 77.9 | Do. |
| Non-added | | 26.9 | Yellow | 67.5 | Yellow. |

[1] The stabilizer is shown in terms of the number as described hereinabove.
[2] Percent by weight based on the amount of polyurethane polymer.

What is claimed is:

1. A polyurethane elastomer composition stabilized against deteriorations, wherein there is incorporated, in sufficient amount to effectively prevent deteriorations thereof, at least one of piperidinosulfide compounds having the general formula

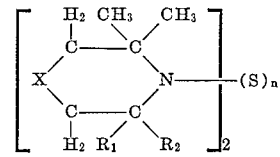

wherein $R_1$ and $R_2$, which may be the same or different, represent an alkyl group, an aryl group or hydrogen atom provided that $R_1$ and $R_2$ are not simultaneously hydrogen atom, or they form, together with the carbon atom to which they are bonded, a saturated 5-, 6- or 7-membered alicyclic ring which may be substituted with an alkyl group; X represents $>C=O$, $>CH_2$ or a group of the formula $>CH-O-R_3$ wherein $R_3$ represents hydrogen atom, an acyl group or a N-substituted carbamoyl group; and $n$ represents an integer of 2 to 4 inclusive.

2. A polyurethane elastomer composition stabilized against deteriorations according to claim 1, wherein there is further incorporated, in sufficient amount to effectively prevent deteriorations thereof, at least one of phenol compounds having the general formula

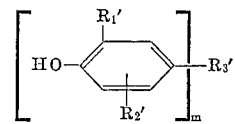

wherein $R_1'$ represents hydrogen atom or tert-butyl; $R_2'$ represents hydrogen atom or an alkyl group; $m$ represents an integer of 1 or 2; and $R_3'$ represents an alkyl group or an alkoxy group when $m$ is 1 or represents sulfur atom,

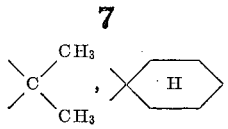

or a group of the formula

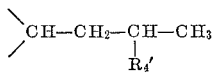

wherein $R_4'$ represents hydrogen atom or a group of the formula

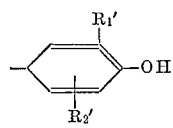

wherein $R_1'$ and $R_2'$ are as defined above when $m$ is 2.

3. A polyurethane elastomer composition according to claim 1, wherein there is incorporated, in an amount of 0.01 to 5% by weight, based on the amount of the polyurethane polymers, at least one compound selected from the group consisting of bis(2,2,6,6-tetramethylpiperidino)disulfide;
bis(2,2,6,6-tetramethylpiperidino)trisulfide;
bis(4-oxo-2,2,6,6-tetramethylpiperidino)disulfide;
bis(4-oxo-2,2,6,6-tetramethylpiperidino)trisulfide;
bis(2,2-dimethyl-4-oxo-6-cyclohexylpiperidino) disulfide;
bis(2,2-dimethyl-6-phenylpiperidino)disulfide;
bis(2,2,6-trimethyl-6-phenyl-4-oxopiperidino)disulfide;
1,1'-bis(1-aza-2,2-dimethyl-4-oxo-spiro[5,5]undecyl) trisulfide;
1,1'-bis(1-aza-2,2-dimethyl-7-methyl-spiro[5,5]undecyl)disulfide;
bis(4-hydroxy-2,2,6,6-tetramethylpiperidino)disulfide;
bis(4-benzoyloxy-2,2,6,6-tetramethylpiperidino)tetrasulfide; and
bis[4-(N-phenylcarbamoyloxy)-2,2,6,6-tetramethylpiperidino]disulfide.

4. A polyurethane elastomer composition according to claim 3 wherein there is further incorporated, in an amount of 0.01 to 5% by weight each, based on the amount of the polyurethane polymers, at least one compound selected from the group consisting of 4-methyl-2,6-di-tert.-butylphenol;
2-tert.-butyl-4-methoxyphenol;
1,1-bis(2-methyl-4-hydroxy-5-tert.-butylphenyl)butane;
bis(2-methyl-4-hydroxy-5-tert.-butylphenyl)sulfiide;
1,1,3-tris(2-methyl-4-hydroxy-5-tert.-butylphenyl) butane;
2,2-bis(4-hydroxyphenyl)propane; and
1,1-bis(4-hydroxyphenyl)cyclohexane.

5. A polyurethane elastic yarn stabilized against deteriorations, wherein there is incorporated, in sufficient amount to effectively prevent deteriorations thereof, at least one of piperidinosulfide compounds having the general formula

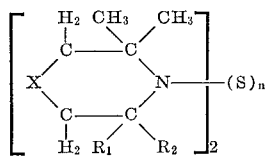

wherein $R_1$ and $R_2$, which may be the same or different, represent an alkyl group, an aryl group or hydrogen atom provided that $R_1$ and $R_2$ are not simultaneously hydrogen atom or they form, together with the carbon atom to which they are bonded, a saturated 5-, 6- or 7-membered alicyclic ring which may be substituted with an alkyl group; X represents $>C=O$, $>CH_2$ or a group of the formula $>CH-O-R_3$ wherein $R_3$ represents hydrogen atom, an acyl group or a N-substituted carbamoyl group; and $n$ represents an integer of 2 to 4 inclusive.

6. A polyurethane elastic yarn stabilized against deteriorations according to claim 5, wherein there is further incorporated, in sufficient amount to effectively prevent deteriorations thereof, at least one of phenol compounds having the general formula

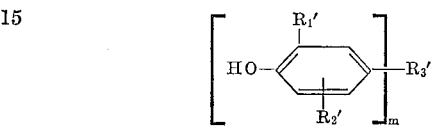

wherein $R_1'$ represents hydrogen atom or tert.-butyl; $R_2'$ represents hydrogen atom or an alkyl group; $m$ represents an integer of 1 or 2; and $R_3'$ represents an alkyl group or an alkoxy group when $m$ is 1 or represents sulfur atom,

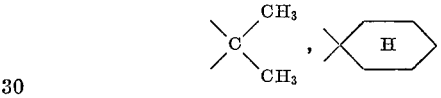

or a group of the formula

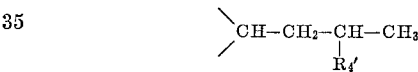

wherein $R_4'$ represents hydrogen atom or a group of the formula

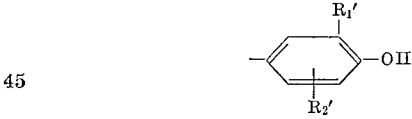

wherein $R_1'$ and $R_2'$ are as defined above when $m$ is 2.

7. A polyurethane elastic yarn according to claim 5, wherein there is incorporated, in an amount of 0.01 to 5% by weight each, based on the amount of the polyurethane polymers, at least one compound selected from the group consisting of bis(2,2,6,6-tetramethylpiperidino)disulfide;
bis(2,2,6,6-tetramethylpiperidino)trisulfide;
bis(4-oxo-2,2,6,6-tetramethylpiperidino)disulfide;
bis(4-oxo-2,2,6,6-tetramethylpiperidino)trisulfide;
bis(2,2-dimethyl-4-oxo-6-cyclohexylpiperidino) disulfide;
bis(2,2-dimethyl-t-phenylpiperidino)disulfide;
bis(2,2,6-trimethyl-6-phenyl-4-oxopiperidino) disulfide;
1,1'-bis(1-aza-2,2-dimethyl-4-oxo-spiro[5,5]undecyl) trisulfide;
1,1'-bis(1-aza-2,2-dimethyl-7-methyl-spiro[5,5]undecyl)disulfide;
bis(4-hydroxy-2,2,6,6-tetramethylpiperidino)disulfide;
bis(4-benzoyloxy-2,2,6,6-tetramethylpiperidino) tetrasulfide; and
bis[4-(N-phenylcarbamoyloxy)-2,2,6,6-tetramethylpiperidino]disulfide.

8. A polyurethane elastic yarn according to claim 7, wherein there is further incorporated, in an amount of 0.01 to 5% by weight each, based on the amount of the polyurethane polymers at least one compound selected from the group consisting of
4-methyl-2,6-di-tert.-butylphenol;
2-tert.-butyl-4-methoxyphenol;
1,1-bis(2-methyl-4-hydroxy-5-tert.-butylphenyl) butane;
bis(2-methyl-4-hydroxy-5-tert.butylphenyl)sulfide;
1,1,3-tris(2-methyl-4-hydroxy-5-tert.-butylphenyl) butane;
2,2-bis(4-hydroxyphenyl)propane; and
1,1-bis(4-hydroxyphenyl)cyclohexane.

References Cited
UNITED STATES PATENTS

| | | | |
|---|---|---|---|
| 3,103,542 | 9/1963 | Fielden | 260—800 |
| 3,329,645 | 7/1967 | Childers | 260—33.6 |
| 3,474,068 | 10/1969 | Murayama et al. | 260—45.8 |

DONALD E. CZAJA, Primary Examiner

R. A. WHITE, Assistant Examiner

U.S. Cl. X.R.

260—45.95

UNITED STATES PATENT OFFICE
CERTIFICATE OF CORRECTION

Patent No. 3,560,433      Dated February 2, 1971

Inventor(s) ISAMU SUZUKI ET AL

It is certified that error appears in the above-identified patent and that said Letters Patent are hereby corrected as shown below:

In the heading of the patent, the name of the first of the two assignees should read:

-- Sankyo Company Limited --

Signed and sealed this 3rd day of August 1971.

(SEAL)
Attest:

EDWARD M. FLETCHER, JR.
Attesting Officer

WILLIAM E. SCHUYLER, J
Commissioner of Patent